United States Patent
Suzuki et al.

(10) Patent No.: US 7,036,892 B2
(45) Date of Patent: May 2, 2006

(54) ELECTRIC POWERED PUMP

(75) Inventors: Shigemitsu Suzuki, Takahama (JP); Motohisa Ishiguro, Anjo (JP); Mitsuru Terayama, Anjo (JP); Atsushi Unno, Kariya (JP); Hiroshi Kajino, Aichi-ken (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/855,571

(22) Filed: May 28, 2004

(65) Prior Publication Data

US 2005/0012387 A1  Jan. 20, 2005

(30) Foreign Application Priority Data

| May 28, 2003 | (JP) | 2003-151419 |
| May 28, 2003 | (JP) | 2003-151421 |
| May 26, 2004 | (JP) | 2004-156311 |

(51) Int. Cl.
*F04B 53/00* (2006.01)
*H02K 9/18* (2006.01)

(52) U.S. Cl. ............... 303/116.4; 417/423.14
(58) Field of Classification Search ........ 417/321, 417/352, 353, 354, 355, 366, 410.1, 420, 417/423.3, 423.7, 423.11, 423.14, 424.1, 417/424.2, 410.3, 423.12, 423.13; 303/10, 303/116.4; 701/22; 184/6.12; 310/89, 254, 310/227, 261, 40 MM
See application file for complete search history.

(56) References Cited

U.S. PATENT DOCUMENTS

| 4,445,820 | A | * | 5/1984 | Hayashi et al. ......... 417/366 |
| 4,726,746 | A | * | 2/1988 | Takada et al. ......... 417/423.1 |
| 5,053,664 | A | * | 10/1991 | Kikuta et al. ............ 310/114 |
| 5,360,322 | A | | 11/1994 | Henein et al. |
| 5,501,292 | A | * | 3/1996 | Kawashima et al. ...... 180/220 |
| 5,655,892 | A | | 8/1997 | Cherniawski et al. |
| 5,810,568 | A | * | 9/1998 | Whitefield et al. ...... 417/423.8 |
| 6,048,179 | A | * | 4/2000 | Forster ..................... 417/364 |
| 6,563,245 | B1 | * | 5/2003 | Suzuki et al. .............. 310/91 |
| 6,565,473 | B1 | * | 5/2003 | Endo et al. ............... 475/117 |

(Continued)

FOREIGN PATENT DOCUMENTS

DE  42 31 784 A1  3/1994

(Continued)

*Primary Examiner*—Christopher P. Schwartz
(74) *Attorney, Agent, or Firm*—Buchanan Ingersoll PC

(57) ABSTRACT

An electric powered pump includes a pump body having a suction chamber, a discharge chamber and an accommodation concave portion for accommodating a pump rotor, a rotational shaft rotatably supported by the pump body, the pump rotor is fixed at a first end of the rotational shaft, a motor having a rotor including a magnet, an annular stator including a core and a coil, the rotor is fixed at a second end of the rotational shaft which is opposite to the first end of the rotational shaft, a motor housing having a hole shaped cylindrical space inside of the stator formed with the motor housing, the motor housing is fixed at the pump body to be positioned in the cylindrical space having a predetermined clearance relative to the rotor, a driver portion for driving the motor, a accommodation space formed at an end surface of the motor housing provided at a side of the second end of the rotational shaft, the accommodation space is configured to accommodate the driver portion, and a cover for covering the accommodation space.

11 Claims, 7 Drawing Sheets

U.S. PATENT DOCUMENTS

| | | | |
|---|---|---|---|
| 2004/0108779 A1* | 6/2004 | Boettger et al. | 310/89 |
| 2004/0115077 A1* | 6/2004 | Iwanari | 417/423.3 |
| 2004/0234399 A1* | 11/2004 | Lopatinsky et al. | 417/423.7 |
| 2005/0012387 A1* | 1/2005 | Suzuki et al. | 303/116.4 |
| 2005/0074343 A1* | 4/2005 | Naito | 417/423.3 |

FOREIGN PATENT DOCUMENTS

| | | |
|---|---|---|
| EP | 0 905 378 A1 | 3/1999 |
| EP | 001482175 A2 * | 12/2004 |
| JP | 2000-18173 | 1/2000 |
| JP | 2002-317772 | 10/2002 |

* cited by examiner

ELECTRIC POWERED PUMP

CROSS REFERENCE TO RELATED APPLICATIONS

This application is based on and claims priority under 35 U.S.C. §119 to Japanese Patent Application No. 2003-151419, filed on May 28, 2003, Japanese Patent Application No. 2003-151421, filed on May 28, 2003, and Japanese Patent Application No. 2004-156311, filed on May 26, 2004, the entire contents of which are incorporated herein by reference.

FIELD OF THE INVENTION

This invention generally relates to an electric powered pump. More particularly, the present invention pertains to an electric powered pump used as a sub-pump for oil pressure supply to clutch elements in transmission of idling stopped automobile, or for cooling oil supply to a motor of Electric powered vehicle.

BACKGROUND

A known electric powered pump unitarily includes a hydraulic pressure pump, an electric motor for driving the hydraulic pump, and a driver unitarily provided on the electric powered motor for controlling the driving electric current applied to the electric powered motor has been developed. With the known electric powered pump described in Japanese Patent Laid-Open Publication No. 2000-018173, the driver is provided between the hydraulic pump and the electric powered motor and the communication between the suction passage of the hydraulic pump and a discharge chamber is established by bypassing the part of a suction passage via the driver, an electric powered motor portion, and a bearing portion in order for circulating the operational fluid adjacent to the driver to cool the driver corresponding to a heat generating portion.

The small size electric powered pump likewise the known electric powered pump is used as an auxiliary pump, for example, as a pressure supply source to a clutch in a transmission at the engine stop state of a hybrid vehicle including an internal combustion engine and a motor generator and as a supply source for a cooling oil of a motor generator for the electric vehicle and the hybrid vehicle, or the like.

In this case, the high heat radiation is required for the electric powered pump because the electric powered pump is positioned on or adjacent to the motor generator generating the heat and the transmission in the high temperature engine room. Further, with the electric powered pump with the unitarily provided driver, the heat radiation is required to be increased further because the driver per se generates the heat.

With the construction of the known electric powered pump described in Japanese Patent Laid-Open Publication No. 2000-018173, a portion of the operational fluid is circulated adjacent to the driver using the hydraulic pressure pump to cool the driver, which does not achieve the sufficient cooling effect when the temperature of the operational fluid is high.

Further, because the transmission provided with the electric powered pump and the motor generator are vibrated, the construction to restrain the vibration of the driver is required in order to prevent the damage and the detachment of the electronic parts of the driver due to the vibration.

A need thus exists for providing an electric powered pump, which achieves the high heat radiation and restrains the vibration of the driver.

SUMMARY OF THE INVENTION

In light of the foregoing, the present invention provides an electric powered pump which includes a pump operational portion, an accommodation concave portion for accommodating the pump operational portion, a suction chamber, a discharge chamber, a pump body formed with the accommodation concave portion, the suction portion, and the discharge portion. The electric powered pump further includes a rotational shaft rotatably supported by the pump body, a pump rotor provided at the pump operational portion and fixed at a first end of the rotational shaft, a brush less DC motor including a magnet, a rotor provided at the brush-less DC motor, the rotor fixed at a second end of the rotational shaft, an annular stator including a core and a coil of the brush-less DC motor, a motor housing including a cylindrical space with a bottom inside the stator, the motor housing fixed at the pump body to be positioned in the cylindrical space having a predetermined clearance relative to the rotor, a driver portion for driving the brush-less DC motor, a concave accommodation space formed at an end surface of the motor housing provided at a backside of the cylindrical space, the concave accommodation space configured to accommodate the driver portion, and a cover for covering the concave accommodation space.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
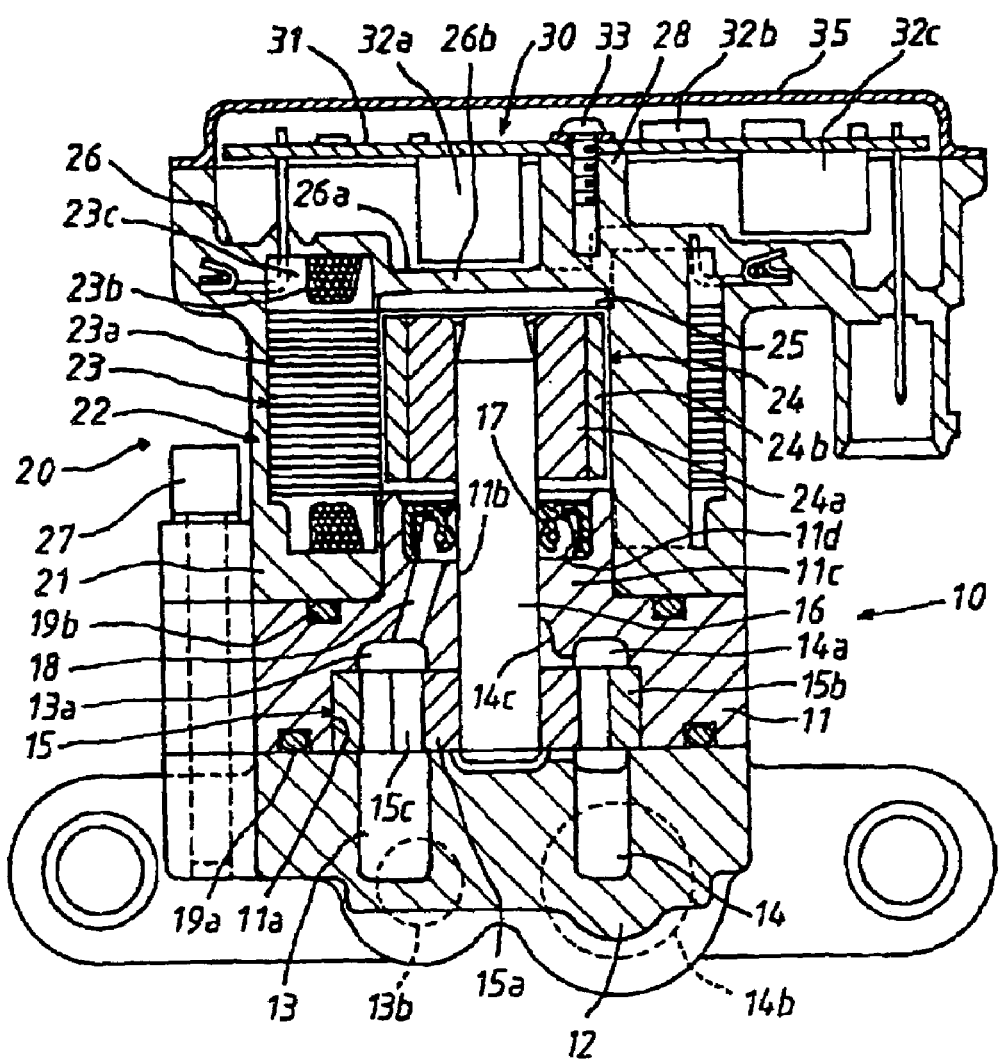
FIG. 1 shows a longitudinal-sectional view of an electric powered pump according to a first embodiment of the present invention.

Embodiments of the present invention will be explained with reference to the illustrations of the drawing figures as follows.

As shown in FIG. 1, an electric powered pump includes a pump portion 10, a motor portion 20 for rotating the pump portion 10, and a driver portion 30 for driving the motor portion 20.

As shown in FIG. 1, a casing of the pump portion 10 includes a pump body 11 formed with a circular accommodation concave portion 11a at an end surface thereof and a pump cover 12 for covering an end surface where the accommodation concave portion 11a of the pump body 11 is formed via a sealing member 19a to be liquid tight. The pump body 11 is formed with a bearing bore 11b eccentric relative to the accommodation concave portion 11a. A pump operation portion 15 including a trochoid pump provided in the accommodation concave portion 11a includes an inner rotor (pump rotor) 15a of an external gear and an outer rotor 15b of an inner gear geared with the external gear. An external peripheral surface of the outer rotor 15 is rotatably supported by the accommodation concave portion 11a. The inner rotor 15a is coaxially press fitted to be fixed to an end portion of a rotational shaft 16 rotatably supported by the bearing bore 11b.

As shown in FIG. 1, plural pump operational chambers 15c are formed between the inner and external gears of the inner rotor 15a and the outer rotor 15b. The volume of the pump operational chambers is changeable in accordance with the rotation of the inner rotor 15a and the outer rotor 15b. Suction chambers 13, 13a are operatively formed along the range where the volume of the pump operation chamber 15c increases at an internal surface of the pump cover 12 and a bottom surface of the accommodation concave portion 11a which are formed at both sides of the pump operation chamber 15c. Discharge chambers 14, 14a are operatively formed along the range where the volume of the pump operation chamber 15c decreases at the internal surface of the pump cover 12 and the bottom surface of the accommodation concave portion 11a. The pump cover 12 includes a suction port 13b in communication with the suction chamber 13 and a discharge port 14b in communication with the discharge chamber 14.

As shown in FIG. 1, a portion of the pump body 11 at an opposite side of the accommodation concave portion 11a of the pump operational portion 15 is formed with a cylindrical portion 11c coaxially with the bearing bore 11b. A first end of the rotational shaft 16 is secured to the inner rotor 15a and a second end of the rotational shaft 16 is projected from the end surface of the cylindrical portion 11c. An external peripheral surface of an oil seal 17 (serving as a sealing member) is fitted at a circular concave portion 11d formed at the end surface of the cylindrical portion 11c of the pump body 11 coaxially with the bearing bore 11b to be liquid tight and tip end of a lip of the oil seal 17 slidably contacts the external peripheral surface of the rotational shaft 16 to be liquid tight so that the pump body 11 and the inside of the motor housing 21 are divided into the accommodation concave portion 11a side and a cylindrical space 25 sides to be liquid tight from one another. A bottom portion of the concave portion 11d is in communication with the suction chamber 13a by a return passage 18 formed in the pump body 11. The pump body 11 includes recess 14c for establishing the communication between the discharge chamber 14a and the bearing bore 11b.

A sensor-less-brush-less DC motor 22 of the motor portion 20 includes an annular stator 23 and a rotor 24 positioned inside of the stator 23 with a predetermined clearance from the stator 23. The rotor 24 includes a cylindrical back yoke 24a and a magnet 24b unitarily secured to an external periphery of the back yoke 24a. As shown in FIG. 1, a first end portion of the rotor 24 is press-fitted to be fixed to the inner rotor 15a of the pump operational portion 15. A second end portion of the motor 24 is coaxially press-fitted to be fixed to the second end of the rotational shaft 16 projected from the end surface of the cylindrical portion 11c. The stator 23 includes a core 23a of a layered plate, made of iron or the like, and a coil 23b wound around a coil support frame 23c. The stator 23 is unitarily molded in the resin made motor housing 21. A cylindrical space 25 with a bottom is formed at the inside of the stator 23 of the motor housing 21. The internal surface of the core 23a may be exposed to the cylindrical space 25 or may be covered with the resin of the motor housing 21, or the like.

As shown in FIG. 1, in the motor housing 21, the cylindrical space 25 is coaxially provided over the external side of the rotor 24 with a predetermined clearance from the rotor 24. An opening side of the cylindrical space 25 is engaged with the cylindrical portion 11c of the pump body 11. The pump body 11, the pump cover 12, and the motor housing 21 are unitarily connected by tightening plural bolts 27 (one shown in FIG. 1) having a hexagon socket. The length in the tangential direction of the core 23a of the stator 23 and the rotor 24 are approximately the same. With the foregoing connection state, the positions of the core 23a of the stator 23 and the rotor 24 at the both ends in the tangential direction are approximately correspondent to each other, and thus the coil 23b of the stator 23 and the coil support frame 23c project from the core 23a at the both ends in the tangential direction.

A concaved accommodation space 26 for accommodating the driver portion 30 for driving the motor portion 20 is formed at an end surface of the motor housing 21 at an opposite side of the cylindrical space 25. A concave portion 26a constructed to be concaved into the coil support frame 23c and the coil 23b at the first end of the stator 23 molded at the motor housing 21 is formed at a bottom portion of the accommodation space 26. The concave portion 26a and the cylindrical space 25 are divided by a bottom wall 26b. The driver portion 30 includes a board 31 and plural parts 32a, 32b, 32c assembled to the board 31. The driver portion 30 is assembled by assembling the board 31 and plural projections 28 for assembling provided at the bottom portion of the accommodation space 26 to be tightened with small screws 33. The driver portion 30 is covered with the cover 35 to be liquid tight. Large parts 32a of the driver portion 30 such as a condenser is positioned at the board 31 to be positioned in the concave portion 26a.

The operation of the electric powered pump will be explained as follows. The electric current controlled by the driver portion 30 is applied to the coil 23b of the stator 23 of the sense-less-brush-less DC motor 22 to generate the rotational magnetic field for rotating the rotor 24. The rotation of the rotor 24 actuates the inner rotor 15a of the pump operational portion 15 to rotate via the rotational shaft 16. Thus, the operational fluid sucked in the pump operational chamber 15c of the trochoid pump 15 from the suction port 13b via the suction chamber 13 is discharged from the discharge port 14b via the discharge chamber 14. A portion of the operational fluid discharged from the pump operation chamber 15c is provided between the rotational shaft 16 and the bearing bore 11b of the pump body 11 via the recess 14c to lubricate the shaft support portion and is provided in the bottom portion of the concave portion 11d provided with the oil seal 17 to return to the suction chamber 13a via a return passage 18. Because the inside of the pump body 11 and the housing 21 is divided into the accommodation concave portion 11a side and the cylindrical space 25 side to be liquid tight by the oil seal 17, the operational fluid does not leak in the cylindrical space 25.

According to the embodiment of the present invention, the inner rotor 15a of the pump operational portion 15 and the rotor 24 of the sensor-less-brush-less DC motor 22 are fixed at the both sides of the single rotational shaft 16 so that the pump body 11, the pump cover 12, and the motor housing 21 are unitarily connected. Further, with the construction of the embodiment of the present invention, because the driver portion 30 for driving the sensor-less-brush-less DC motor 22 is accommodated in the concaved accommodation space 26 formed at the end surface of the motor housing 21 positioned opposite to the cylindrical space 25 and is covered with the cover 35, the driver portion 30 is also unitarily formed with the pump portion 10 and the motor portion 20. Thus, the size and the weight of the electric powered pump are reduced, which reduces the manufacturing cost thereof accordingly.

With the construction of the electric powered pump of the present invention, the cylindrical space 25 having the bottom is formed at the inside of the portion molded with the stator 23 of the resin made motor housing 21. With this construction, because the internal surface of the core 23a of the stator 23 is exposed to the cylindrical space 25 and the crack may be generated at the resin even if the cylindrical space 25 is covered with the resin of the motor housing 21. Thus, in case the operational fluid directly contacts the internal surface of the cylindrical space 25, a small amount of the operational fluid may leak outside via the core 23a of the layered plate made of iron or the like and the crack. With the construction of the embodiment of the present invention, the inside of the pump body 11 and the motor housing 21 are divided into the accommodation concave portion 11a side and the cylindrical space 25 side by the oil seal 17. With this construction, because the operational fluid does not leak into the cylindrical space 25, the leakage of the operational fluid to the outside via the stator 23 can be prevented. The construction of the invention is not limited and the electric powered pump may be constructed without using the oil seal 17, for example, by providing means for blocking the leakage of the operational fluid via the stator 23. Accordingly, because the thermal transmission increases by the contact of the operational fluid to the stator 23, the cooling efficiency of the stator 23 can be increased.

According to the embodiment of the present invention, the driver portion 30 is provided at one of the end portions of the electric powered pump, where the driver portion 30 is provided facing the atmosphere. With this construction, the heat at the driver potion 30 is likely to be escaped, which is effective for increasing the cooling efficiency of the stator 23.

With the construction of the electric powered pump of the present invention, the concave portion 26a constructed to be concaved into the inside of the coil support frame 23c and the coil 23b at the first end side of the molded stator 23 is formed at the bottom portion of the accommodation space 26 provided at the motor housing 21 as the concave and the large parts 32a for the driver portion 30 is positioned in the concave portion 26a. With this construction, because the concave portion 26b for accommodating the large parts 32a is formed by using at least a portion of the dead space generated between the end portion of the coil 23b most projected in the tangential direction and a tip end of the rotor 24 in the tangential direction at the inside of the stator 23, the size of the motor housing 21 of the motor portion 20 can be reduced by reducing the projection amount from the stator 23 of the accommodation space 26 necessary for accommodating the parts 32a, 32b, 32c.

Figure 2:
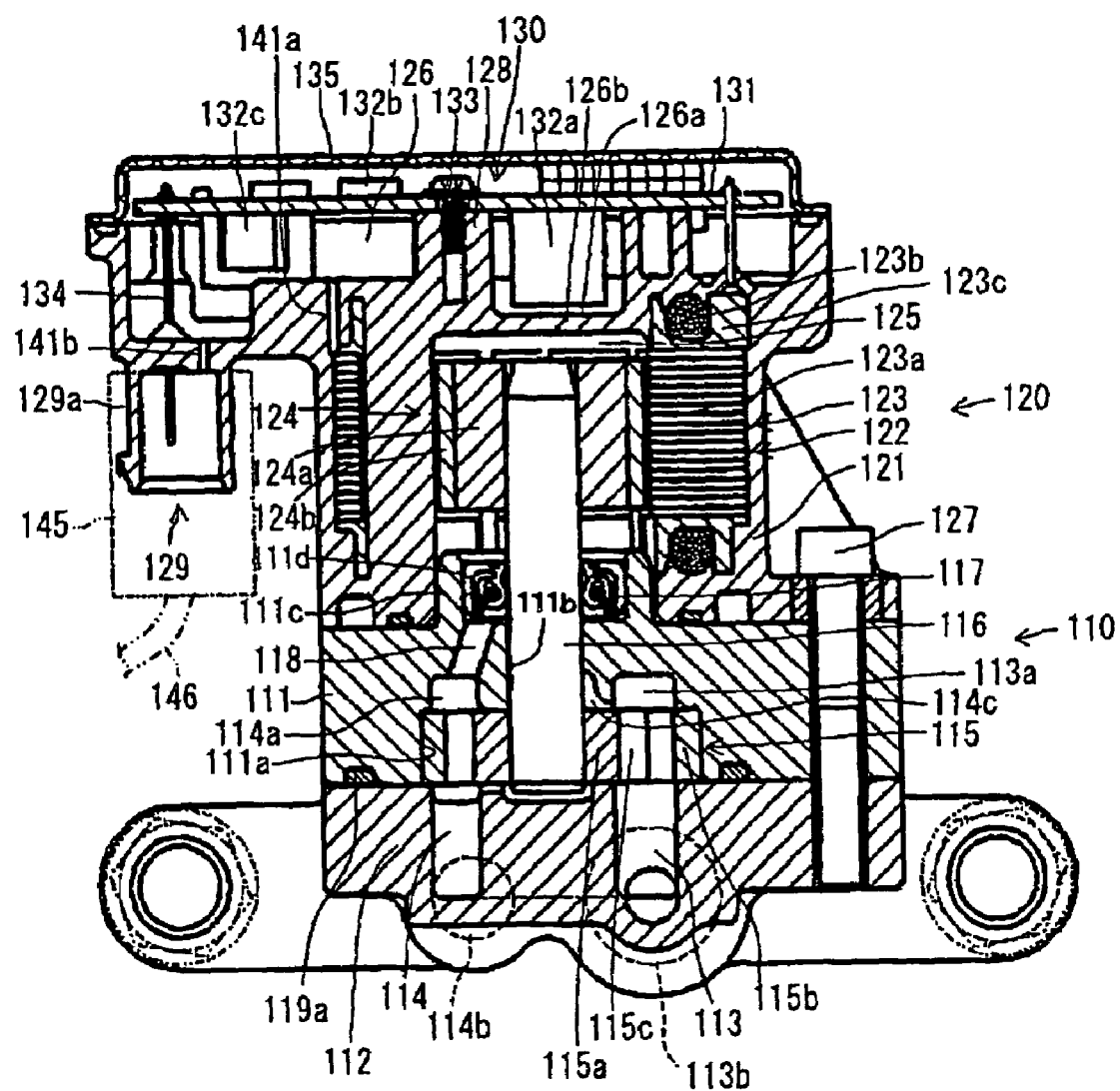
FIG. 2 shows a longitudinal-sectional view of an electric powered pump according to a second embodiment of the present invention.

A second embodiment of the present invention will be explained with reference to FIGS. 2–4. As shown in FIG. 2, an electric powered pump of the second embodiment includes a pump portion 110, a motor portion 120 for actuating the pump portion 110 to rotate, and a driver portion 130 for driving the motor portion 120. The driver portion 130 is integrally formed with the electric powered motor.

As shown in FIG. 2, a casing of the pump portion 110 includes a pump body 111 formed with a circular accommodation concave portion 111a at a first end surface of the pump portion 110 and a pump cover 112 for covering the accommodation concave portion 111a of the pump body 111 and the end surface thereof to be liquid tight via an annular seal member 119a. A bearing bore 111b eccentric relative to the accommodation concave portion 111a is formed at the pump body 111. A pump operational portion 115 including a trochoid pump provided in the accommodation concave portion 111a includes an inner rotor (e.g., pump rotor) 15a of an external gear and an outer rotor 115b of an inner gear geared with the external gear. An external peripheral surface of the outer rotor 115b is rotatably supported by the accommodation concave portion 111a. The inner rotor 115a is coaxially press-fitted at a first end of a rotational shaft 116 rotatably supported by the bearing bore 111b.

As shown in FIG. 2, plural pump operational chambers 115c for increasing and decreasing the volume in accordance with the rotation of the inner rotor 115a and the outer rotor 115b are formed between the inner and the external gears of the inner rotor 115a and the outer rotor 115b geared one another. Suction chambers 113, 113a are operatively formed along the range where the volume of the pump operation chamber 115c increases at an internal surface of the pump cover 112 and a bottom surface of the accommodation concave portion 111a which are formed at both sides of the pump operation chamber 115c. Discharge chambers 114, 114a are operatively formed along the range where the volume of the pump operation chamber 115c decreases at the internal surface of the pump cover 112 and the bottom surface of the accommodation concave portion 111a. The pump cover 112 includes a suction port 113b in communication with the suction chamber 113 and a discharge port 114b in communication with the discharge chamber 114.

As shown in FIG. 2, a portion of the pump body 111 at an opposite side of the accommodation concave portion 111a of the pump operational portion 115 is formed with a cylindrical portion 111c coaxially with the bearing bore 111b. A first end of the rotational shaft 116 is secured to the inner rotor 115a and a second end of the rotational shaft 116 is projected from the end surface of the cylindrical portion 111c. An external peripheral surface of an oil seal 117 (serving as a sealing member) is fitted at a circular concave portion 111d formed at the end surface of the cylindrical portion 111c of the pump body 111 coaxially with the bearing bore 111b to be liquid tight and tip end of a lip of the oil seal 117 slidably contacts the external peripheral surface of the rotational shaft 116 to be liquid tight so that the pump body 111 and the inside of the motor housing 121 are divided into the accommodation concave portion 111a side and a cylindrical space 125 side to be liquid tight from each other. A bottom portion of the concave portion 111d is in communication with the suction chamber 113a by a return passage 118 formed in the pump body 111. The pump body 111 includes recess 114c for establishing the communication between the discharge chamber 114a and the bearing bore 111b.

A sensor-less-brush-less DC motor 122 of the motor portion 120 includes an annular stator 123 and a rotor 124 positioned inside of the stator 123 with a predetermined clearance from the stator 123. The rotor 124 includes a cylindrical back yoke 124a and a magnet 124b unitarily secured to an external periphery of the back yoke 124a. As shown in FIG. 2, a first end portion of the rotor 124 is press fitted to be fixed to the inner rotor 15a of the pump operational portion 115. A second end portion of the motor 124 is coaxially press-fitted to be fixed with the second end of the rotational shaft 116 projected from the end surface of the cylindrical portion 111c. The stator 123 includes a core 123a of a layered plate, made of iron or the like, and a coil 123b wound around a coil support frame 123c. The stator 123 is unitarily molded in the resin made motor housing 121. A cylindrical space 125 with a bottom is formed at the inside of the stator 123 of the motor housing 121. The internal surface of the core 123a maybe exposed to the cylindrical space 125 or may be covered with the resin of the motor housing 121, or the like.

As shown in FIG. 2, in the motor housing 121, the cylindrical space 125 is coaxially provided over the external side of the rotor 124 with a predetermined clearance from the rotor 124. An opening side of the cylindrical space 125 is engaged with the cylindrical portion 111c of the pump body 111. The pump body 111, the pump cover 112, and the motor housing 121 are unitarily connected by tightening plural bolts 127 (one shown in FIG. 1) having hexagon socket. The length in the tangential direction of the core 123a of the stator 123 and the rotor 124 are approximately the same. With the foregoing connection state, the positions of the core 123a of the stator 123 and the rotor 124 at the both ends in the tangential direction are approximately correspondent to each other, and thus the coil 123b of the stator 123 and the coil support frame 123c project from the core 123a at the both ends in the tangential direction.

A concaved accommodation space 126 for accommodating the driver portion 130 for driving the motor portion 120 is formed at an end surface of the motor housing 121 at an opposite side of the cylindrical space 125. A concave portion 126a constructed to be concaved into the coil support frame 123c and the coil 123b at the first end of the stator 123 molded at the motor housing 121 is formed at a bottom portion of the accommodation space 126. The concave portion 126a and the cylindrical space 125 are divided by a bottom wall 126b. The driver portion 130 includes a board 131 and plural parts 132a, 132b, 132c assembled to the board 131. The driver portion 130 is assembled by assembling the board 131 and plural projections 28 for assembling provided at the bottom portion of the accommodations space 26 to be tightened with small screws 133. The driver portion 130 is covered with the cover 135 to be liquid tight. Large parts 132a of the driver portion 130 such as a condenser is positioned at the board 131 to be positioned in the concave portion 126a.

A connector 129 is formed at an end portion of the motor housing 121 formed with the accommodation space 126. A terminal 134 electrically connected with the driver portion 130 is provided in a connector housing 129a of the connector 129. An external power source and a connector 145 of a harness 146 connected with the control device are provided in the connector 129 to be liquid tight for supplying the power to the driver portion 130 and for inputting state signals for a control command and a vehicle, or the like. The connector housing 129a is formed having an opening downward so that the water is unlikely leaked into the connector housing 129a. The connectors 129, 145 are configured to be water repellent. The air passes through the inside of the harness 146.

Figure 3:
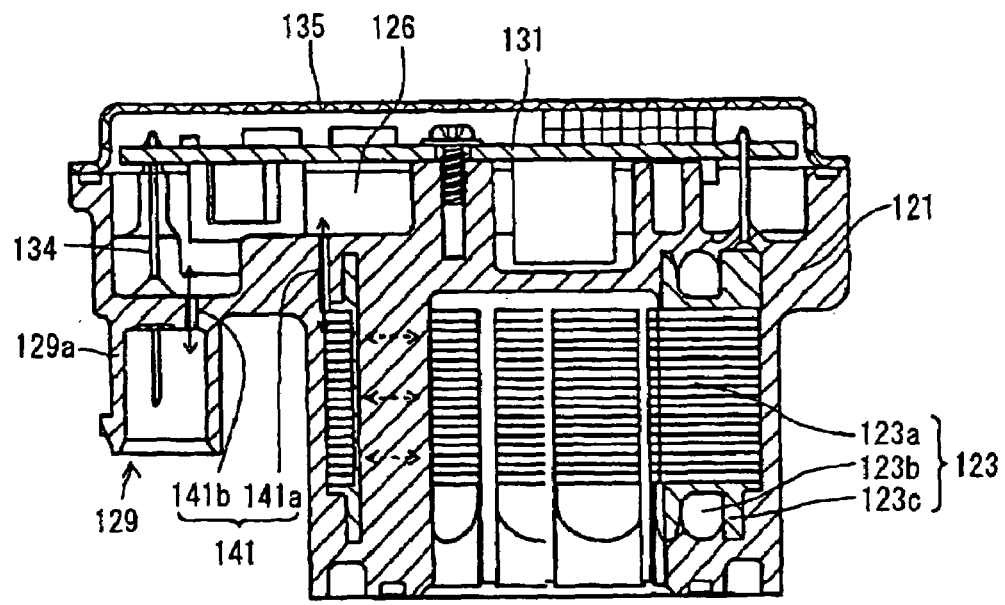
FIG. 3 shows a longitudinal-sectional view of a motor housing unitarily assembled with a driver portion shown in FIG. 2.
Figure 4:
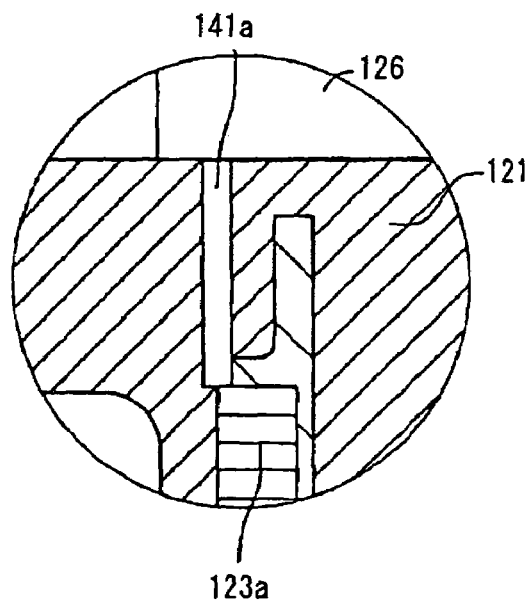
FIG. 4 is a partial enlarged view showing a first air vent shown in FIG. 2.

As shown in FIGS. 2–3, an air vent 41 for establishing the communication between the inside of the core 123a of the stator 123 (i.e., the cylindrical space 125) and the outside of the motor housing 121 is formed at the motor housing 121. The air vent 141 includes a first air vent 141a for establishing the communication between the inside of the core 123a and the accommodation space 126 and a second air vent 141b for establishing the communication between the accommodation space 126 and the motor housing 121. As shown in FIG. 4, a bottom end of the first air vent 141a opens facing an external peripheral rim portion of the core 123a and a top end of the first air vent 141a opens facing the accommodation space 126 to be formed at the end portion of the motor housing 121. The second air vent 141b is formed at the end portion of the motor housing 121, as shown in FIGS. 2–3, upon the bottom end of the second air vent 141b opens facing the connector housing 129a and the top end of the second air vent 141b opens facing the accommodation space 126. Thus, as shown with an arrow in FIG. 3, the air passes through the first air vent 141a and the small clearances between the core 123a of the layered plates made of iron, or the like, of between the cylindrical space 125 and the accommodation space 126. The air passes through the second air vent 141b between the accommodation space 126 and the motor housing 121.

The operation of the electric powered pump will be explained as follows. The electric current controlled by the driver portion 30 is applied to the coil 23b of the stator 23 of the sense-less-brush-less DC motor 22 to generate the rotational magnetic field for rotating the rotor 24. The rotation of the rotor 24 actuates the inner rotor 15a of the pump operational portion 15 to rotate via the rotational shaft 16. Thus, the operational fluid sucked in the pump operational chamber 15c of the trochoid pump 15 from the suction port 13b via the suction chamber 13 is discharged from the discharge port 14b via the discharge chamber 14. A portion of the operational fluid discharged from the pump operation chamber 15c is provided between the rotational shaft 16 and the bearing bore 11b of the pump body 11 via the recess 14c to lubricate the shaft support portion and is provided in the bottom portion of the concave portion 11d provided with the oil seal 17 to return to the suction chamber 13a via a return passage 18. Because the inside of the pump body 11 and the housing 21 is divided into the accommodation concave portion 11a side and the cylindrical space 25 side to be liquid tight by the oil seal 17, the operational fluid does not leak in the cylindrical space 25.

With the construction of the second embodiment of the electric powered pump including the driver portion 130 for driving the motor portion 120 unitarily formed on the motor housing 121, the inside of the motor housing, i.e., the cylindrical space 125, is in communication with the outside of the motor housing 121 via the small clearance between the layered plates, made of iron or the like, of the core 123a of the brush-less DC motor 122, the first air vent 141a, the accommodation space 126, the second air vent 141b, and the harness 146 to be liquid tight. Accordingly in case the pressure in the motor housing 121 is significantly fluctuated, the generation of the pressure difference between the inside and the outside of the motor housing 121 is most likely prevented, thus to prevent the leakage of the water and the external objects via the clearance of the motor housing 121. Further, in case the air in the cylindrical space 125 moves into the accommodation space 126, the sprayed operational fluid is attached to the layered plate, made of iron or the like, of the core 123a to be removed when passing through the clearance between the layered plates, made of iron or the like, of the core 123a even if the sprayed operational fluid is included in the air. Thus, the driver portion 130 can be securely protected from the operational fluid to maintain the high reliability of the operation of the electric powered pump.

With the construction of the second embodiment of the present invention, because the communication is established between the connector housing 129a and the second air vent 141b, the second air vent 141b in connection with the connector housing 129a is most likely covered by the connector 145 provided in the connector 129 to be liquid tight in case the pressure difference between the inside and the outside of the motor housing 121 is generated by the decline of the pressure in the motor housing 121, the leakage of the water and the external objects from the second air vent 141b can be securely prevented.

Still Further, with the construction of the electric powered pump of the second embodiment, the air vents 141a, 141b are provided in addition to that the driver portion 130 is provided at the end portion of the electric powered pump. Accordingly the driver portion 130 is configured to be closer to the atmosphere, which increases the heat radiation of the elements boarded on the driver portion 130.

With the construction of the second embodiment of the present invention, the second air vent 141b may be selectively provided. In case the second air vent 141b is not provided, the inside of the motor housing 121, i.e., the cylindrical space 25, assumes in communication with the accommodation space 126 having the larger volume than the volume of the cylindrical space 125 via the small clearance of the layered plate, made of iron or the like, of the core 123a of the cylindrical space 125 and the first air vent 141a. Thus, because the expansion and the contraction of the cylindrical space 125 is absorbed by the accommodation space 126 even at the fluctuation of the pressure in the motor housing 121, the leakage of the water and the external objects via the clearance of the motor housing 121 can be prevented. In case the air is leaked from the cylindrical space 125 into the accommodation space 126, the sprayed operational fluid is attached to the layered plate, made of iron or the like, of the core 123a to be removed when passing through the clearance between the layered plates, made of iron or the like of the cores 123a even if the sprayed operational fluid is included in the air. Accordingly, the driver portion 130 can be securely protected from the operational fluid to maintain the high reliability of the operation of the electric powered pump.

A third embodiment of the present invention will be explained with reference to FIGS. 5–6. The electric powered pump of the third embodiment shares the basic construction with the electric powered pump of the second embodiment. With the construction of the third embodiment, the driver potion 130 is separated from the motor housing 121 of the electric powered pump and a third air vent 241 is provided instead of the first and the second air vents 141a, 141b of the second embodiment. The explanations for the shared construction with the second embodiment will not be repeated.

The motor housing 221 made of resin is configured to be cylindrical having a bottom. The motor housing 221 includes a core 223a made from layered plates of magnetic body such as layered iron plate, and a stator 223 including a coil wound around a coil support frame, which are unitarily molded. The cylindrical space 125 having the bottom is formed at a portion inside of the stator 223 of the motor housing 221. The internal surface of the core 223a is exposed to the cylindrical space 125. A terminal 234 connected to the both ends of the coil is simultaneously molded. A tip end of the terminal 234 projects from the external wall surface of the motor housing 221. A connector 229 having a connector housing 229a accommodating the terminal 234 is formed at the external peripheral wall surface of the motor housing 221. A connector 245 of a harness 246 connected to the separate driver portion 130 is provided in the connector 229 to be liquid tight and to be controlled by the drive portion 130. The connectors 229, 245 are configured to be water repellent. The air passes through the inside of the harness 246.

Figure 5:
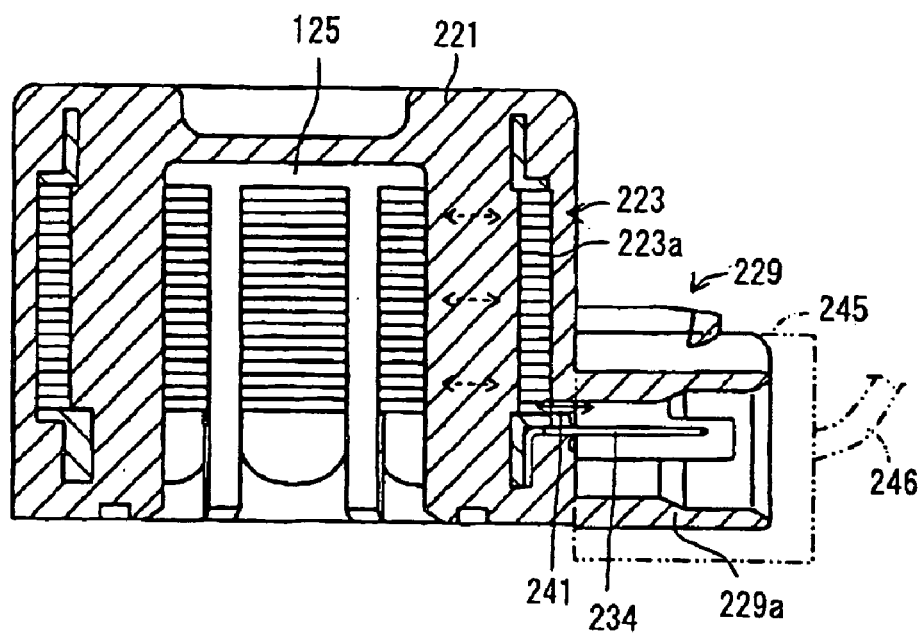
FIG. 5 is a longitudinal-sectional view of a motor housing according to a third embodiment of the present invention.
Figure 6:
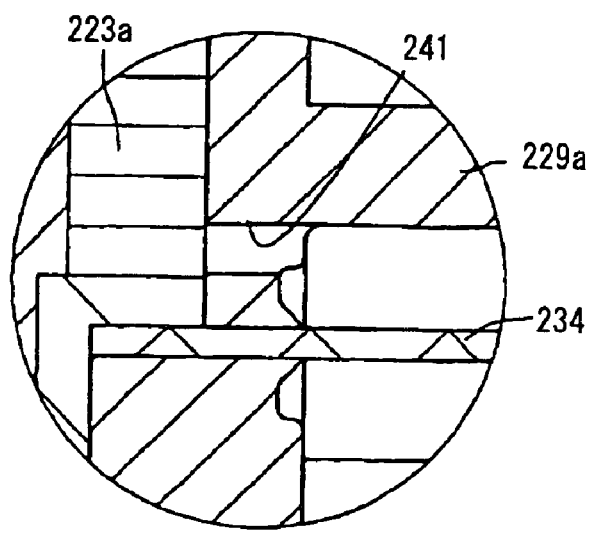
FIG. 6 is a partial enlarged view showing a third air vent shown in FIG. 5.

As shown in FIGS. 5–6, the motor housing 221 includes the third air vent 241 for establishing the communication between the external peripheral portion of the core 223a and the inside of the connector housing 229a. As shown in FIG. 6, the third air vent 241 is configured to open facing the external peripheral rim portion of the core 223a at the first end and to open facing the inside of the connector housing 229a at the second end to be formed on the external peripheral wall of the motor housing 221. Thus, as shown with arrows of FIG. 5, the air moves through the small clearance of the core 223a and the third air vents 241 between the inside of the core 223a, i.e., the cylindrical space 125, and the outside of the motor housing 221.

With the construction of the third embodiment, the communication between the inside of the motor housing 221, i.e., the cylindrical space 125, and the outside of the motor housing 221 is established to be liquid tight via the clearance of the layered plate of the core 223a of the brush-less DC motor 122, the third air vent 241, and the harness 246. Accordingly, in case the pressure in the motor housing 221 is significantly fluctuated, the generation of the pressure difference between the inside and the outside of the motor housing 221 is most likely restrained to prevent the leakage of the water and the external objects via the clearance of the motor housing 221. Further, in case the air in the cylindrical space 125 moves outside, even if the sprayed operational fluid is included in the air, the sprayed operational fluid is attached on the layered plates to be removed when passing through the clearance of the layered plates of the core 223a. Thus, the leakage of the operational fluid in the electric powered pump to the outside can be securely prevented.

Further, because the communication is established between the inside of the connector housing 229a and the third air vent 241, in case the pressure difference is generated between the inside and the outside of the motor housing 221 due to the pressure decline in the motor housing 221, the third air vent 241 in communication with the inside of the connector housing 229a is most likely covered by the connector 245 provided in the connector 229 to be liquid tight. Thus, the leakage of the water and the external objects via the third air vent 241 can be securely prevented.

Still Further, with the construction of the electric powered pump of the second embodiment, the third air vent 241 is provided in addition to that the driver portion 130 is provided at the end portion of the electric powered pump. Accordingly the driver portion 130 is configured to be closer to the atmosphere, which increases the heat radiation of the elements boarded on the driver portion 130.

Figure 7:
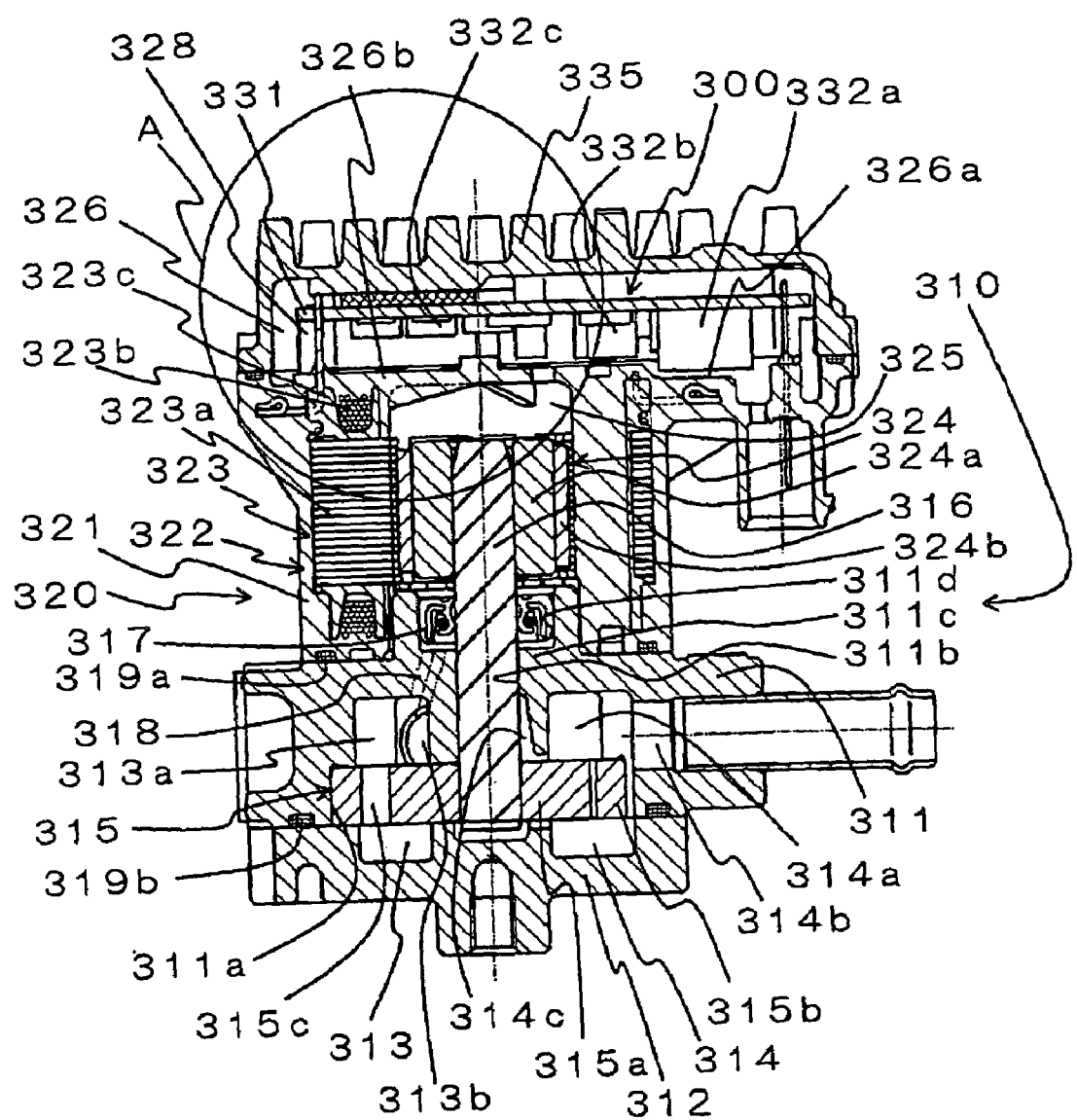
FIG. 7 is a longitudinal-sectional view of an electric powered pump according to a third embodiment of the present invention.
Figure 8:
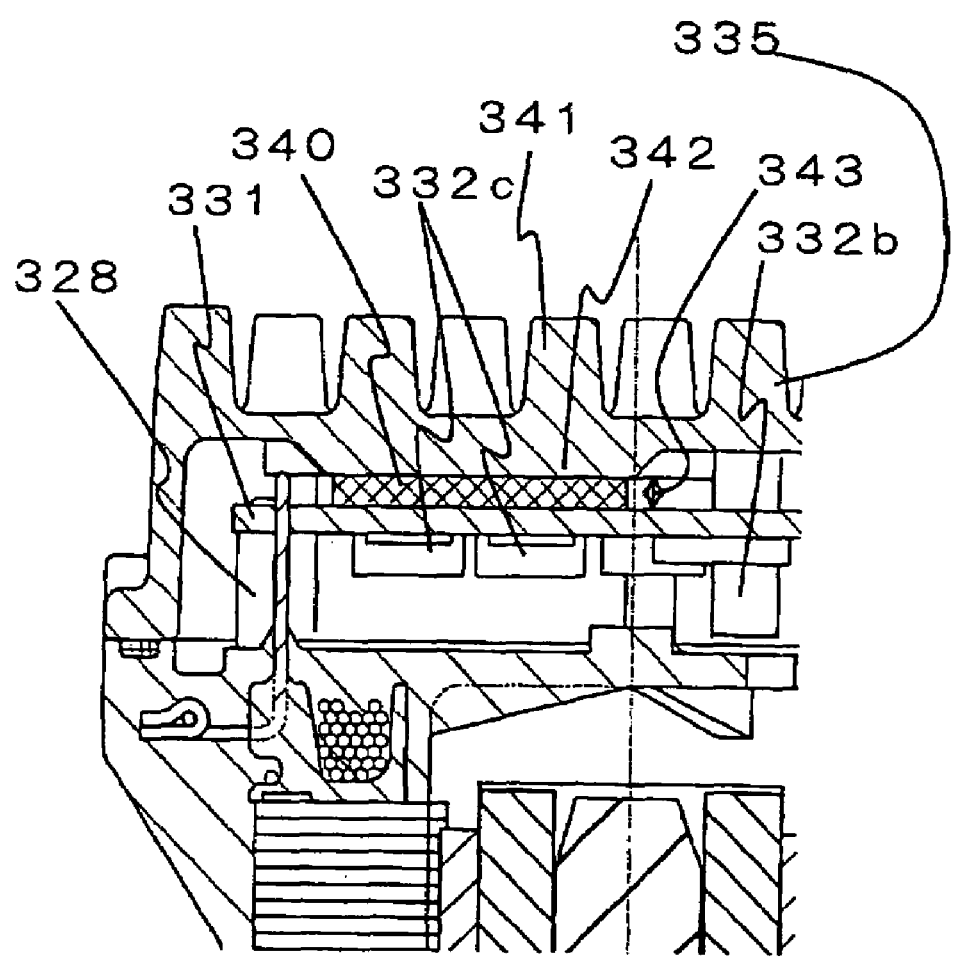
FIG. 8 is a partial enlarged view of the electric powered pump according to the third embodiment of the present invention.
Figure 9:
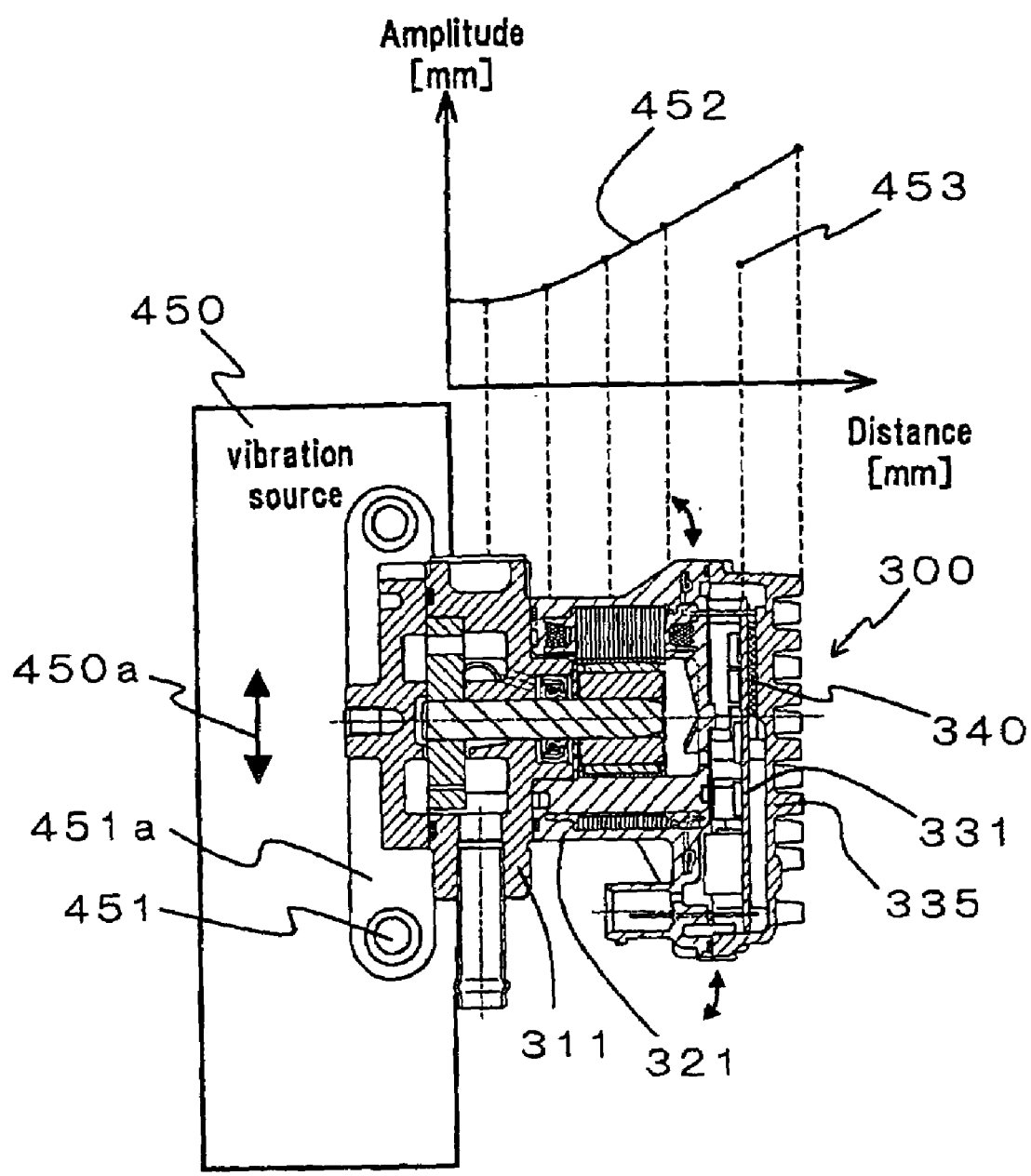
FIG. 9 is a view for explaining vibration insulation effect according to the third embodiment of the present invention.

A third embodiment of the present invention will be explained with reference to FIGS. 7–9. As shown in FIG. 7, an electric powered pump includes a pump portion 310, a motor portion 320 for rotating the pump portion 310, and a driver portion 330 for driving the motor portion 320.

As shown in FIG. 7, a casing of the pump portion 310 includes a pump body 311 formed with a circular accommodation concave portion 311a at an end surface thereof and a pump cover 312 for covering an end surface where the accommodation concave portion 311a of the pump body 311 is formed via a sealing member 319a to be liquid tight. The pump body 311 is formed with a bearing bore 311b eccentric relative to the accommodation concave portion 311a. A pump operation portion 315 including a trochoid pump provided in the accommodation concave portion 311a includes an inner rotor (pump rotor) 315a of an external gear and an outer rotor 315b of an inner gear geared with the external gear. An external peripheral surface of the outer rotor 315 is rotatably supported by the accommodation concave portion 311a. The inner rotor 315a is coaxially press fitted to be fixed to an end portion of a rotational shaft 316 rotatably supported by the bearing bore 311b.

As shown in FIG. 7, plural pump operational chambers 315c are formed between the inner and external gears of the inner rotor 315a and the outer rotor 315b. The volume of the pump operational chambers is changeable in accordance with the rotation of the inner rotor 315a and the outer rotor 315b. Suction chambers 313, 313a are operatively formed along the range where the volume of the pump operation chamber 315c increases at an internal surface of the pump cover 312 and a bottom surface of the accommodation concave portion 311a which are formed at both sides of the pump operation chamber 315c. Discharge chambers 314, 314a are operatively formed along the range where the volume of the pump operation chamber 315c decreases at the internal surface of the pump cover 312 and the bottom surface of the accommodation concave portion 311a. The pump cover 312 includes a suction port 313b in communication with the suction chamber 313 and a discharge port 314b in communication with the discharge chamber 314.

As shown in FIG. 7, a portion of the pump body 311 at an opposite side of the accommodation concave portion 311a of the pump operational portion 315 is formed with a cylindrical portion 311c coaxially with the bearing bore 311b. A first end of the rotational shaft 316 is secured to the inner rotor 315a and a second end of the rotational shaft 316 is projected from the end surface of the cylindrical portion 311c. An external peripheral surface of an oil seal 317 (serving as a sealing member) is fitted at a circular concave portion 311d formed at the end surface of the cylindrical portion 311c of the pump body 311 coaxially with the bearing bore 311b to be liquid tight and tip end of a lip of the oil seal 317 slidably contacts the external peripheral surface of the rotational shaft 316 to be liquid tight so that the pump body 311 and the inside of the motor housing 321 are divided into the accommodation concave portion 311a side and a cylindrical space 325 sides to be liquid tight from one another. A bottom portion of the concave portion 311d is in communication with the suction chamber 313a by a return passage 318 formed in the pump body 311. The pump body 311 includes recess 314c for establishing the communication between the discharge chamber 314a and the bearing bore 311b.

A sensor-less-brush-less DC motor 322 of the motor portion 320 includes an annular stator 323 and a rotor 324 positioned inside of the stator 323 with a predetermined clearance from the stator 323. The rotor 324 includes a cylindrical back yoke 324a and a magnet 324b unitarily secured to an external periphery of the back yoke 324a. As shown in FIG. 7, a first end portion of the rotor 324 is press-fitted to be fixed to the inner rotor 315a of the pump operational portion 315. A second end portion of the motor 324 is coaxially press-fitted to be fixed to the second end of the rotational shaft 316 projected from the end surface of the cylindrical portion 311c. The stator 323 includes a core 323a of a layered plate, made of iron or the like, and a coil 323b wound around a coil support frame 323c. The stator 323 is unitarily molded in the resin made motor housing 321. A cylindrical space 325 with a bottom is formed at the inside of the stator 323 of the motor housing 321. The internal surface of the core 323a may be exposed to the cylindrical space 325 or may be covered with the resin of the motor housing 321, or the like.

As shown in FIG. 7, in the motor housing 321, the cylindrical space 325 is coaxially provided over the external side of the rotor 324 with a predetermined clearance from the rotor 324. An opening side of the cylindrical space 325 is engaged with the cylindrical portion 311c of the pump body 311. The pump body 311, the pump cover 312, and the motor housing 321 are unitarily connected by tightening plural bolts (not shown in FIG. 7) having a hexagon socket. The length in the tangential direction of the core 323a of the stator 323 and the rotor 324 are approximately the same. With the foregoing connection state, the positions of the core 323a of the stator 323 and the rotor 324 at the both ends in the tangential direction are approximately correspondent to each other, and thus the coil 323b of the stator 323 and the coil support frame 323c project from the core 323a at the both ends in the tangential direction.

A concaved accommodation space 326 for accommodating the driver portion 330 for driving the motor portion 320 is formed at an end surface of the motor housing 321 at an opposite side of the cylindrical space 325. A concave portion 326a constructed to be concaved into the coil support frame 323c and the coil 323b at the first end of the stator 323 molded at the motor housing 321 is formed at a bottom portion of the accommodation space 326. The concave portion 326a and the cylindrical space 325 are divided by a bottom wall 326b. The driver portion 330 includes a board 331 and condenser 332a, comparator 332b, switching element 332c assembled to the board 331. The driver portion 330 is assembled by assembling the board 331 and plural projections 328 for assembling provided at the bottom portion of the accommodation space 326 to be tightened with small screws 333. The driver portion 330 is covered with the cover 335 made of aluminum to be liquid tight. Large parts 332a of the driver portion 330 such as a condenser is positioned at the board 331 to be positioned in the concave portion 326a.

The vibration insulation construction of the board 331 and the heat radiation construction by a heat conduction member 340 provided at the board 331 of the driver portion 330 will be explained with reference to FIG. 8. The heat conduction member 340 is a heat conduction sheet made from silicon system viscoelastic body whose thermal transmission rate is higher than the air. The heat conduction sheet 340 having the squeeze of 0.13–1.13 mm (5–45% to thickness of conduction sheet 340) is sandwiched between a contact portion 342 formed at the cover 335 and the board 331 in the accommodation space 326 provided at the end surface of the motor housing 321. The board 331 is fixed at a tip portion of the plural projections 328 (one is shown in FIGS. 7–8) for assembling unitarily resin formed with the motor housing 321 with a screw. The contact portion 342 provided at the cover 335 projects into the accommodation space 326 side. A tip end portion of the contact portion is configured to be flat. A predetermined clearance is formed between the board 331 and the contact portion 340 by fixing the cover 335 to the motor housing 321 with a bolt. Because the size of the clearance is smaller than the thickness of the heat conduction sheet 340 before sandwiched between the contact portion 342 and the board 331, the heat conduction sheet 340 is sandwiched between the board 331 and the contact portion 340 having the predetermined squeeze. A switching element 332c corresponding to the electronic parts having the largest heat generation in the driver portion 330 is positioned at the backside of the board 331 where the heat conduction sheet 340 is positioned facing the board 331. Thus, the heat generated by the switching element 332C, or the like, is effectively transmitted from the heat conduction sheet 340 to the contact portion 342 provided at the cover 335 to radiate the heat into the air via plural stick heat radiation fins 341 provided at the cover 335.

Accordingly, the electric powered pump of the third embodiment positively transmits the heat generated at the driver portion 330 to the cover 335 to radiate into the air via the heat radiation fin 341 of the cover 335. Further, because the heat radiation performance from the driver portion 330 can be sufficiently ensured even if the electric powered pump is applied to the circulation pump of the cooling oil for the motor generator of the electric vehicle and positioned contacting or adjacent to the motor generator corresponding to the source of the heat, the temperature increase of the electronic parts 332a, 332b, 332c can be restrained. Accordingly, the reliability can be ensured even if the electric powered pump is applied to the circulation pump of the cooling oil for the motor generator of the electric vehicle.

The heat conduction sheet 340 includes the viscoelasticity having the damping coefficient of approximately 0.125–0.20 m/s for preventing the vibration transmitted from the cover 335 and the motor housing 321 to the board 331. FIG. 9 shows the vibration of the electric powered pump 300 fixed at a vibration source 450. As shown in FIG. 9, the electric powered pump 300 is fixed to the vibration source 450 with a bolt 451 via bracket 451a. The electric powered pump 300 is vibrated by the influence of the vibration of the vibration source 450 with an amplitude 450a. The horizontal axis in FIG. 9 shows the distance of the electric powered oil pump 300 from the vibration source 450. The distance from the vibration source 450 is further at the right side of the graph. The vertical axis of FIG. 9 shows the amplitude of the vibration measured at each position of positional sensors provided at the pump body 311, the motor housing 321, and the cover 335. A curve 452 shows the actually measured amplitude. The amplitude of the curve 452 corresponds to the amplitude of the vibration of the vibration source 450 at the further left of the graph in FIG. 9. As going to the right side of the graph in FIG. 9, in other words, as the further from the bolt fixing position of the vibration source 450 of the electric powered oil pump 300, the actual amplitude increases to be the maximum at the tip end of portion of the cover 335. In the meantime, a point 453 in the graph of FIG. 9 shows the measured amplitude of the vibration of the board 331. The vibration of the board 331 is smaller than the vibration of the cover 335 comparing the amplitude 453 of the board 331 and the curve 452 showing the amplitude corresponding to the cover 335 (i.e., the level of the amplitude corresponds to the amplitude of the vibration source increased by 10 percent).

Thus, the heat conduction sheet 340 sandwiched between the cover 335 and the board 331 insulates the vibration transmitted from the vibration source 450 to the board 331 via the pump body 311 of the electric powered pump 300, the motor housing 321, and the cover 335. Even if the vibration source 450 vibrates, the electric powered pump 300 insulates the vibration of the broad 331 to avoid the excessive vibration of the driver portion 330. The vibration source may be the transmission of the vehicle, the internal combustion engine, the motor for the hybrid vehicle, and the motor for the electric vehicle, or the like.

The operation of the electric powered pump will be explained as follows. The electric current controlled by the driver portion 330 is applied to the coil 323b of the stator 323 of the sense-less-brush-less DC motor 322 to generate the rotational magnetic field for rotating the rotor 324. The rotation of the rotor 324 actuates the inner rotor 315a of the pump operational portion 315 to rotate via the rotational shaft 316. Thus, the operational fluid sucked in the pump operational chamber 315c of the trochoid pump 315 from the suction port 13b via the suction chamber 313 is discharged from the discharge port 314b via the discharge chamber 314. A portion of the operational fluid discharged from the pump operation chamber 315c is provided between the rotational shaft 316 and the bearing bore 311b of the pump body 311 via the recess 314c to lubricate the shaft support portion and is provided in the bottom portion of the concave portion 311d provided with the oil seal 317 to return to the suction chamber 313a via a return passage 318. Because the inside of the pump body 311 and the housing 321 is divided into the accommodation concave portion 311a side and the cylindrical space 325 side to be liquid tight by the oil seal 317, the operational fluid does not leak in the cylindrical space 325.

According to the embodiment of the present invention, the inner rotor 315a of the pump operational portion 315 and the rotor 324 of the sensor-less-brush-less DC motor 322 are fixed at the both sides of the single rotational shaft 316 so that the pump body 311, the pump cover 312, and the motor housing 321 are unitarily connected. Further, with the construction of the embodiment of the present invention, because the driver portion 330 for driving the sensor-less-brush-less DC motor 322 is accommodated in the concaved accommodation space 326 formed at the end surface of the motor housing 321 positioned opposite to the cylindrical space 325 and is covered with the cover 335, the driver portion 330 is also unitarily formed with the pump portion 310 and the motor portion 320. Thus, the size and the weight of the electric powered pump are reduced, which reduces the manufacturing cost thereof accordingly.

With the construction of the electric powered pump of the present invention, the cylindrical space 325 having the bottom is formed at the inside of the portion molded with the stator 323 of the resin made motor housing 321. With this construction, because the internal surface of the core 323a of the stator 323 is exposed to the cylindrical space 325 and the crack may be generated at the resin even if the cylindrical space 325 is covered with the resin of the motor housing 321. Thus, in case the operational fluid directly contacts the internal surface of the cylindrical space 325, a small amount of the operational fluid may leak outside via the core 323a of the layered plate made of iron or the like and the crack. With the construction of the embodiment of the present invention, the inside of the pump body 311 and the motor housing 321 are divided into the accommodation concave portion 311a side and the cylindrical space 325 side by the oil seal 317. With this construction, because the operational fluid does not leak into the cylindrical space 325, the leakage of the operational fluid to the outside via the stator 323 can be prevented. The construction of the invention is not limited and the electric powered pump may be constructed without using the oil seal 317, for example, by providing means for blocking the leakage of the operational fluid via the stator 323. Accordingly, because the thermal transmission increases by the contact of the operational fluid to the stator 323, the cooling efficiency of the stator 323 can be increased.

According to the embodiment of the present invention, the driver portion 330 is provided at one of the end portions of the electric powered pump, where the driver portion 330 is provided facing the atmosphere. With this construction, the heat at the driver potion 330 is likely to be escaped, which is effective for increasing the cooling efficiency of the stator 323.

With the construction of the electric powered pump of the present invention, the concave portion 326a constructed to be concaved into the inside of the coil support frame 323c and the coil 23b at the first end side of the molded stator 323 is formed at the bottom portion of the accommodation space 326 provided at the motor housing 321 as the concave and the large parts 332a for the driver portion 330 is positioned in the concave portion 326a. With this construction, because the concave portion 326b for accommodating the large parts 332a is formed by using at least a portion of the dead space generated between the end portion of the coil 323b most projected in the tangential direction and a tip end of the rotor 324 in the tangential direction at the inside of the stator 323, the size of the motor housing 321 of the motor portion 320 can be reduced by reducing the projection amount from the stator 323 of the accommodation space 326 necessary for accommodating the parts 332a, 332b, 332c.

With the construction of the electric powered motor unitarily including the hydraulic pump, the brush-less DC motor for driving the hydraulic pump, and the driver for applying the driving electric current to the coil, by providing the driver at the end of the electric powered pump to be covered with the cover, the dimension of the driver to contact the atmosphere via the cover is increased to be efficiently cooled down. In addition, because the heat rational member provided between the driver and the cover transmits the heat of the driver to the cover, the heat generated by the driver is radiated even if the electric powered pump is positioned in the engine room and adjacent to the heat generation body such as the motor, which achieves the electric powered pump with high heat resistance.

According to the embodiment of the present invention, by providing the heat radiation member contacting the heat generating element such as switching elements which is the heat generating source of the driver, the heat generated at the driver can be effectively transmitted to the cover to radiate to provide the electric powered pump with the high heat resistance performance.

According to the embodiment of the present invention, by constructing the heat radiation ember with the viscoelastic member (e.g., silicon system elastic member), the heat conduction member radiates the heat by transmitting the generated heat of the driver to the cover and the vibration from the housing of the electric powered pump and the cover is attenuated to be transmitted to the cover. Thus, the vibration of the driver is restrained and the electric powered pump having the high vibration resistance can be provided. More particularly, the vibration of the driver can be prevented from the vibration of the motor generator and the vibration of the transmission in the engine room connected to the electric powered pump.

The principles, preferred embodiment and mode of operation of the present invention have been described in the foregoing specification. However, the invention which is intended to be protected is not to be construed as limited to the particular embodiments disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An electric powered pump comprising:
   a pump body having a suction chamber, a discharge chamber and an accommodation portion for accommodating a pump rotor;
   a rotational shaft rotatably supported by the pump body;
   the pump rotor is fixed at a first end of the rotational shaft;
   a motor having a motor rotor including a magnet, an annular stator including a core and a coil;
   the motor rotor is fixed at a second end of the rotational shaft which is opposite to the first end of the rotational shaft;
   a motor housing having a hole shaped cylindrical space inside of the stator formed with the motor housing, the motor housing is fixed at the pump body to be positioned in the cylindrical space having a predetermined clearance relative to the rotor;
   a driver portion for driving the motor;
   an accommodation space formed at an end surface of the motor housing which is configured to accommodate the driver portion; and
   a cover for covering the accommodation space.

2. The electric powered pump according to claim 1, further comprising:
   a seal member provided at an end surface of the pump body facing the cylindrical space;
   wherein the inside of the pump body and the motor housing is liquid tight separated into an accommodation portion side and a cylindrical space side by slidably contacting the seal member to an external peripheral surface of the rotational shaft.

3. The electric powered pump according to claim 2, further comprising:
   a first air vent provided at the motor housing for establishing communication between an external peripheral portion of the core and the accommodation space; and
   the core including layered plates made from magnetic material.

4. The electric powered pump according to claim 3, further comprising:
   a connector housing configured to be provided with a connector of a harness connected to an external power source to be liquid tight, the connector housing formed at an external periphery of the motor housing; and
   a second air vent for establishing the communication between the accommodation space and the connector housing.

5. The electric powered pump according to claim 2, further comprising:
   a concave portion provided at a bottom portion of the accommodation space configured to be concaved into the inside of an end portion of the motor housing in a parallel direction relative to the rotational shaft.

6. The electric powered pump according to claim 1, further comprising:
   a heat conduction member contacting the driver portion and the cover, the heat conduction member positioned between the driver portion and the cover.

7. The electric powered pump according to claim 6, wherein the heat conduction member is made of viscoelastic material.

8. The electric powered pump according to claim 6, wherein the heat conduction member is positioned adjacent to a heat-generating element of the driver portion.

9. The electric powered pump according to claim 8, wherein the heat conduction member is made of viscoelastic material.

10. The electric powered pump according to claim 1, further comprising:

a concave portion provided at a bottom portion of the accommodation space configured to be concaved into the inside of an end portion of the motor housing in a parallel direction relative to the rotational shaft.

11. The electric powered pump according to claim 1, wherein the cover for covering the accommodation space having a heat exchanging structure on the outer surface of the cover.

* * * * *